United States Patent [19]

Le Bihan Hervé et al.

[11] Patent Number: 4,972,408

[45] Date of Patent: Nov. 20, 1990

[54] METHOD AND APPARATUS FOR COMBINING AND FOR SEPARATING A LOW DATA RATE DIGITAL CHANNEL WITH OR FROM THE HIGH DATA RATE DIGITAL CHANNEL OF A TRANSMISSION LINK

[75] Inventors: Le Bihan Hervé, Saint Laurent, France; Francois Xavier, Lannion, both of France

[73] Assignee: Alcatel Cit, Paris, France

[21] Appl. No.: 343,233

[22] Filed: Apr. 26, 1989

[30] Foreign Application Priority Data

Apr. 29, 1988 [FR] France .................. 88 05750

[51] Int. Cl.⁵ .............................. H04J 3/00
[52] U.S. Cl. ....................... 370/84; 370/112
[58] Field of Search .......... 370/84, 110.4, 112

[56] References Cited

U.S. PATENT DOCUMENTS

| | | | |
|---|---|---|---|
| 4,387,460 | 6/1983 | Boutmy et al. | 370/110.4 |
| 4,716,563 | 12/1987 | Roust | 370/110.4 |
| 4,763,326 | 8/1988 | Krick | 370/110.4 |
| 4,831,662 | 5/1989 | Kuhn | 370/110.4 |

*Primary Examiner*—Douglas W. Olms
*Assistant Examiner*—Min Jung
*Attorney, Agent, or Firm*—Sughrue, Mion, Zinn, Macpeak & Seas

[57] ABSTRACT

A method of combining and separating a low data rate digital channel with or from the high data rate digital channel of a transmission link in which the low data rate digital channel S1(t) is combined with the high data rate digital channel signal S2(t) in a composite transmission S(t) by overmodulation or by amplitude superposition, and in which the high data rate digital channel signal S2(t) is regenerated from the composite transmission S(t) by comparing the instantaneous amplitude value of the signal S(t) with a level (d, d') close to one-half of the minimum useful amplitude of the component of the high data rate digital channel signal S2(t) in the composite transmission S(t), the method being characterized in that the low data rate digital channel signal S2(t) is extracted from the composite transmission S(t) by subtracting the regenerated high data rate digital channel signal S2(t) from the composite signal after both the composite transmission signal S(t) and the regenerated high rate digital channel signal S2(t) have been subjected to lowpass filtering.

10 Claims, 2 Drawing Sheets

METHOD AND APPARATUS FOR COMBINING AND FOR SEPARATING A LOW DATA RATE DIGITAL CHANNEL WITH OR FROM THE HIGH DATA RATE DIGITAL CHANNEL OF A TRANSMISSION LINK

BACKGROUND OF THE INVENTION

The present invention relates to combining and separating a low data rate digital channel with or from the high data rate digital channel of a transmission link by overmodulation or amplitude superposition applied to a signal transmitted on the line.

In this type of operation which is commonly performed for adding a service path to a digital transmission link, the overmodulation or amplitude superposition factor must be chosen in such a manner as to obtain the same error rate performance in the high data rate digital channel and in the low data rate channel, while nevertheless ensuring that said factor remains sufficiently low for the major portion of the power transmitted to line to remain dedicated to the high data rate digital channel.

In most conventional transmission links, the signal of the high data rate digital channel does not interfere with the signal of the low data rate digital channel since it is encoded using a redundant transmission code such as the 5B6B or the 12B1P1C codes, etc., which facilitate clock recovery and error detection on the line and which also have the property of eliminating the D.C. component and of attenuating low-frequency components. This means that a low overmodulation or superposition factor may be used and the low data rate channel can be separated merely by lowpass filtering.

In recent very high data rate transmission links such as optical fiber transmission links, it has become necessary to abandon transmission encoding for the high data rate digital channel since it suffers from the drawback of further increasing the data rate. In the absence of such encoding, the high data rate digital channel has low-frequency components and these constitute major interference for the low data rate digital channel, and they are countered by increasing the overmodulation or amplitude superposition factor, and consequently by increasing the fraction of the transmitted power which is dedicated to the low data rate digital channel.

SUMMARY OF THE INVENTION

The object of the present invention is to make it possible to combine and to separate a low data rate digital channel with or from the very high data rate digital channel of a transmission link while using an overmodulation or superposition factor which is low, thereby enabling substantially all of the transmitted power to be dedicated to transmitting the very high data rate digital channel.

The present invention provides a method of combining and separating a low data rate digital channel with or from the high data rate digital channel of a transmission link in which the low data rate digital channel is combined with the high data rate digital channel signal in a transmission signal by overmodulation or by amplitude superposition, and in which the high data rate digital channel signal is regenerated from the transmission signal by comparing the instantaneous amplitude value of said signal with a level close to one-half of its minimum useful amplitide of the component of the high data rate digital channel signal, and in which the low data rate digital channel signal is extracted from the transmission signal by subtracting the regenerated high data rate digital channel signal from this composite transmission signal after both the composite transmission signal $S(t)$ and the regenerated high data rate digital channel signal have been subjected to lowpass filtering.

The invention also provides apparatus for implementing the above method.

BRIEF DESCRIPTION OF THE DRAWINGS

Other characteristics and advantages of the invention appear from the following description of an implementation given by way of example. This description makes reference to the accompanying drawings, in which.

DETAILED DESCRIPTION OF THE INVENTION

Figure 1:
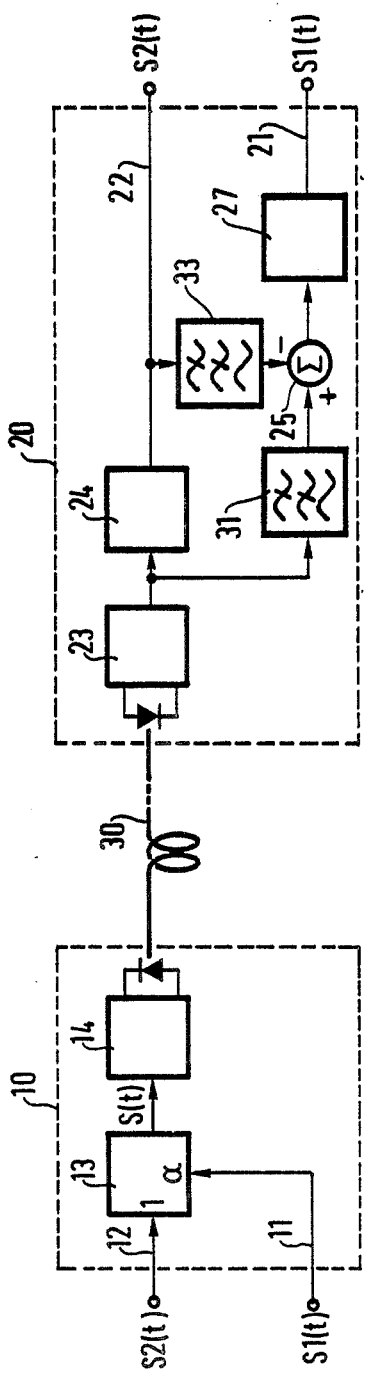
FIG. 1 is a block diagram of apparatus in accordance with the invention for combining and separating a low data rate digital channel with or from the high data rate digital channel of an optical fiber transmission link.

FIG. 1 shows a sender 10 and a receiver 20 connected by an optical fiber link 30 for transmitting a signal $S1(t)$ of a low data rate digital channel and a signal $S2(t)$ of a high data rate digital channel applied to inputs 11 and 12 of the sender 10 and taken from distinct outputs 21 and 22 of the receiver 20.

The sender 10 has an input modulator 13 which receives the signals $S1(t)$ and $S2(t)$ from the low and high data rate digital channels in the form of binary electric signals having two levels 0 and 1, and which, in a conventional manner, generates a composite supermodulation electrical signal $S(t)$ having the form:

$$S(t) = (1 + \alpha S1(t))S2(t)$$

or a superposition electrical signal $S(t)$ having the form:

$$S(t) = S2(t) + \alpha S1(t)$$

where $\alpha$ is the supermodulation factor or the amplitude superposition factor. An optical sender 14 placed after the modulator 13 uses the composite electrical signal $S(t)$ to vary the intensity of the light emitted by a laser diode or by a light-emitting diode (LED) into the optical fiber link 30.

The receiver receivers the composite signal $S(t)$ in the form of variations in the intensity of light conveyed by the optical fiber 30 and it transforms them into an electrical signal by means of an input preamplifier and photodetector 23. After the photodetector 23, it includes a first regenerator 24 which delivers the high data rate digital signal signal $S2(t)$ on output 22, an analog subtractor 25 having a positive input connected to the output of the photodetector 23 via a lowpass filter 31 and a negative input connected to the output of the first regenerator 24 via a lowpass filter 33, and a second regenerator 27 placed after the subtractor 25 and delivering the low data rate digital channel S1(t) on output 21.

The first regenerator 24 may be preceded by a lowpass filter (not shown) having a passband for opitmizing the signal-to-noise ratio of the high data rate digital channel, with said band having a width equal, for example, to 0.7 times the baud frequency of the signal on said channel. It regenerates the high data rate digital channel signal S2(t) in a conventional manner by comparing the instantaneous amplitude of the composite signal S(t) delivered by the photodetector 23 to a level which is close to one-half of the minumum usable amplitude of its component corresponding to the high data rate digital channel signal. It may also resynchronize the version of the signal S2(t) available on the output 22 with the clock of the high data rate digital channel as recovered by means of an oscillator which is phased locked on the mean position of the transitions in the composite signal S(t).

The analog substrator 25 eliminates the remainder of the composite signal S(t) as filtered by the lowpass filter 31 which is due solely to the high data rate digital channel signal S2(t) and which constitutes an interference component when detecting the signal S1(t) of the low data rate digital channel. It retains only the overmodulation or superposition fringe.

The passband of the lowpass filters 31 and 33 matches the passband of the low data rate digital channel, and its band width may be, for example, close to 0.7 times the baud frequency of the signal of this channel. In addition, in order to obtain a signal at the output from the substractor 25 with an optimum signal-to-noise ratio, it is necessary to have quasi-identical signals at the inputs to the substrator, said signals differing only in the component of the low data rate digital channel of the composite signal. This is made possible by giving the filters 31 and 33 slightly different characteristics in order to compensate for the frequency contents of the two signals to be substracted which are not identical because of the different paths followed by these two signals (ignoring differences due to the low data rate digital channel component in the composite signal). Thus, since the regenerated version of the high data rate digital channel signal S2(t) has a much richer spectrum at the very low frequency end than does the high data rate digital channel component at the output from the photodetector 23, the filter 33 is preferably given a non-zero low-frequency cutoff which is higher than that of the filter 31 whose low-frequency cutoff may either by zero, or else it may by non-zero but very low, thereby compensating this difference in the spectra of the signals. In contrast, the high-frequency cutoffs of these two filters are identical and are advantageously equal to 0.7 times the baud frequency of the low data rate digital channel signal. The delay and the amplitude of the two signals to be substracted may also be adjusted by adjusting the phase and the attenuation of the filter 33.

The second regenerator 27 regenerates the version of the low data rate digital channel signal S1(t) made available at the output 21 by comparing the instantaneous amplitude of the version of the signal S1(t) delivered by the substractor 25 with a level which is close to one-half of its mean amplitude. It may also resynchronize the version of the signal S1(t) made available at the output 21 with the clock of the low data rate digital channel as recovered by means of an oscillator which is phased locked on the mean position of the transitions in the signal delivered by the subtractor 25.

By eliminating the major portion of the noise due to the presence of the high data rate digital channel signal S2(t) in the composite transmission signal S(t), it is possible to reduce the overmodulation or superposition factor and thus the transmitted power devoted to the low data rate digital channel. Thus, for a given error rate in the low data rate digital channel, the presence of the analog subtractor 25 makes it possible, for example, to reduce the overmodulation factor from 22% to 3.5% only for a low data rate to high data rate ratio equal to $8 \times 10^{-4}$. simultaneously, the interference on the high data rate digital channel due to the low data rate digital channel reduces from 1 dB to less than 0.15 dB.

Another advantage stems from the matched filtering performed on the two signals to be subtractor. At the output from the filters 33 and 31, the signals are in the frequency band of the low data rate digital channel signal, and this means that these two signals can be subtracted using low frequency electronic circuits.

Figure 2:
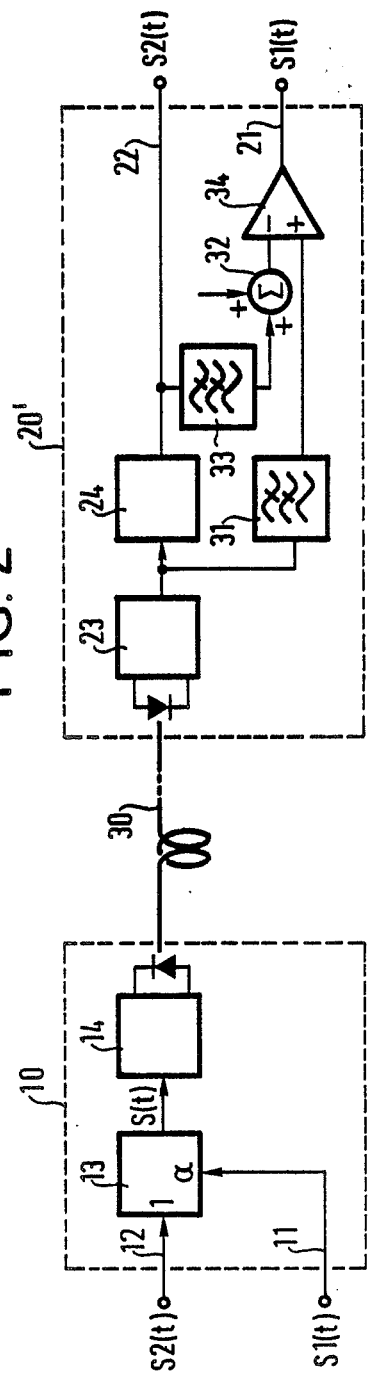
FIG. 2 is a block diagram of a variant of the apparatus shown in FIG. 1.

FIG. 2 shows a variant of the FIG. 1 apparatus in which items that are unchanged continue to be given the same references. This variant differs only at the receiver 20', and in the receiver it differs only in the circuits for extracting and regenerating the low data rate digital channel signal S1(t). These circuits comprise a comparator 34 constituted by a high gain differential amplifier which delivers the low data rate digital channel signal S1(t) to the output 21, which has its non-inverting input connected to the output of the photodetector 23 via the lowpass filter 31, and which has its inverting input connected to the output of the first regenerator 24 via an adder 32 and the lowpass filter 33.

The comparator 34 simultaneously extracts the low data rate digital channel S1(t) and performs it first stage of regeneration which consists in putting it into binary form prior to resynchronizing it. To do this, it takes the transmitted compisite signal S(t) as filtered so as to leave only the frequency band of the low data rate digital channel, and it subtracts therefrom the regenerated high data rate digital channel signal S2(t) likewise filtered so as to leave only the low data rate digital channel frequency band, but also having a decision threshold level added thereto. The adder 32 is constituted by a circuit of resistances and serves to add the decision threshold level to the low-frequency components of the regenerated high data rate digital channel signal S2(t), thereby substrating said threshold level from the low-frequency components in the difference between the signals S(t) and S2(t) as obtained by the comparator 34.

Figure 3:
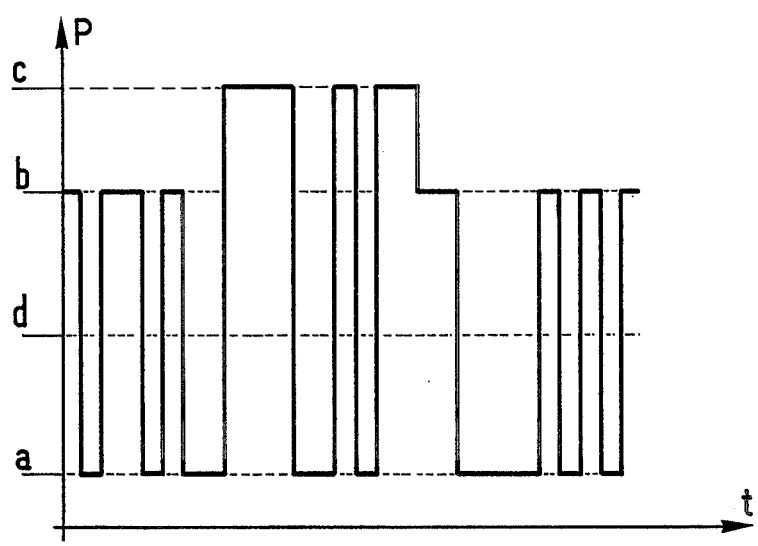
FIG. 3 is a waveform diagram showing, as a function of time, the composite transmission signal resulting from overmodulating the amplitude of the high data rate digital channel signal with the low data rate digital channel signal.

FIG. 3 is a waveform diagram showing the composite signal S(t) transmitted to the line over the optical fiber 30 when amplitude overmodulation is used. This composite signal is a three-level rectangular signal comprising: a bottom level a corresponding to simultaneous logic zero states in the low and the high data rate digital channel signals S1(t) and S2(t); an intermediate level b corresponding to logic one states in the high data rate digital channel S2(t) coinciding with a logic zero state in the low data rate digital channel signal S1(t); and a top level c corresponding to logic one states in the high data rate digital channel signal S2(t) coinciding with a logic one state in the low data rate digital channel signal S1(t). The overmodulation factor $\alpha$ corresponds to the ratio:

$a = (c-b)/(b-a)$

Dotted line d marks the half-way height between the levels a and b and designates the comparison level used by the first regenerator 24.

Figure 4:
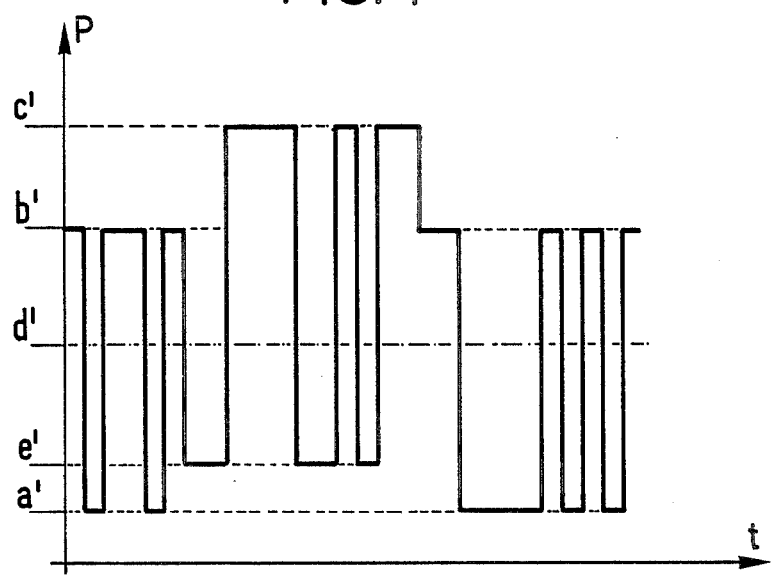
FIG. 4 is a waveform diagram showing, as a function of time, the composite transmission signal resulting from superposing the amplitudes of the high and low data rate digital channels.

FIG. 4 shows the form of the composite signal S(t) sent to the line over the optical fiber 30 when amplitude superposition is used. This composite signal is a four-level rectangular signal comprising: a bottommost level a' corresponding to logic zero states occurring simultaneously in both the low and the high data rate digital channel signals S1(t) and S2(t); a low intermediate level e' corresponding to a logic zero state in the high data rate digital channel signal S2(t) coinciding with a logic one state in the low data rate digital channel signal S1(t); an upper intermediate level b' corresponding to a logic one state in the high data rate digital channel signal S2(t) coinciding with a logic zero state in the low data rate digital channel signal S1(t); and a topmost level c' corresponding to a logic one state occurring simultaneously in both the low and the high data rate digital channel signals S1(t) and S2(t). Dotted line d' designates a height halfway between the levels e' and b' and shows the comparison level used by the first regenerator 24.

Without going beyond the scope of the invention it is possible to modify various dispositions or to replace various means by equivalent means.

We claim:

1. A method of simultaneously maintaining a low data rate digital channel and a high data rate digital channel over a common transmission link, said method comprising the steps of combining a low data rate digital channel S1(t) with a high data rate digital channel signal S2(t) to form a composite transmission signal S(t), and regenerating the high data rate digital channel signal S2(t) from the composite transmission signal S(t) by comparing the instantaneous amplitude value of said signal S(t) with a threshold level associated with the component of the high data rate digital channel signal S2(t) in the composite transmission signal S(t), the method further comprising the steps of:
    lowpass filtering said composite transmission signal S(t) and said regenerated high data rate digital channel signal; and
    extracting the low data rate digital channel signal S1(t) from the composite transmission S(t) by subtracting the lowpass filtered regenerated high data rate digital channel signal from the lowpass filtered composite transmission signal.

2. A method according to claim 1, characterized in that the regenerated high data rate digital channel signal is subjected to lowpass filtering with a non-zero low-frequency cutoff which is higher than a low-frequency cut-off used for the lowpass filtering of the composite transmission signal.

3. A method according to claim 1 or 2, further comprising the step of adjusting the relative phase and attenuation of the two filtered signals prior to said subtracting step.

4. A method according to claim 1, characterized in that the low data rate digital channel signal S1(t) is regenerated after being extracted from the composite transmisssion signal S(t) by comparing the instantaneous value of its amplitude with a level close to one-half of its mean amplitude.

5. Apparatus for simultaneously maintaining a low data rate digital channel and a high data rate digital channel over a common transmission link, the apparatus comprising:
    transmission means (13) for combining a low data rate digital channel signal S1(t) with a high data rate digital channel signal S2(t) to form a composite transmission signal S(t),
    regeneration means (24) for regenerating the high data rate digital channel signal S2(t) from the composite transmission channel signal S(t) by comparing the instantaneous value of the amplitude of said composite transmission signal S(t) with a threshold level associated with the component of the high data rate digital channel signal S2(t) in the composite transmission signal S(t),
    first lowpass filter means (31) operating on the composite signal S(t),
    second lowpass filter means (33) operating on the regenerated high data rate digital channel signal S2(t), and
    subtraction means (25) for subtracting the signal delivered by the second lowpass filter means from the signal delivered by the first lowpass filter means to extract the low data rate digital channel signal S1(t) from the composite transmission signal S(t).

6. Apparatus according to claim 5, further comprising regeneration means responsive to a difference signal output from said subtraction means representing said low data rate digital channel signal S1(t) for regenerating the low data rate digital channel signal S1(t) by comparing the instantaneous value of the amplitude of said difference signal with a level close to one-half of the mean amplitude of said difference signal.

7. Apparatus according to claim 6, characterized in that said subtraction and regeneration means comprise a differential amplifier (34) having a non-inverting input connect to an output of the first lowpass filter means and having an inverting input connected to an output of the second lowpass filter means, together with an adder (32) which is interposed between the output of the second lowpass filter means and the inverting input of the differential amplifier and which adds a D. C. regeneration threshold level to the signal delivered by the second lowpass filter means.

8. Apparatus according to claim 7, characterized in that the adder (32) is constituted by a resistor circuit.

9. A method according to claim 1, wherein said combining step comprises an overmodulation process.

10. A method according to claim 1, wherein said combining step comprises an amplitude superposition process.

* * * * *